United States Patent
Van Der Zwaag et al.

(10) Patent No.: US 10,772,178 B2
(45) Date of Patent: Sep. 8, 2020

(54) ADAPTIVE LIGHTING AUTOMATION

(71) Applicant: SIGNIFY HOLDING B.V., Eindhoven (NL)

(72) Inventors: Marjolein Dimmie Van Der Zwaag, Eindhoven (NL); Dzmitry Viktorovich Aliakseyeu, Eindhoven (NL); Jonathan David Mason, Waalre (NL); Philip Steven Newton, Waalre (NL); Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/475,713

(22) PCT Filed: Dec. 21, 2017

(86) PCT No.: PCT/EP2017/084038
§ 371 (c)(1),
(2) Date: Jul. 3, 2019

(87) PCT Pub. No.: WO2018/127427
PCT Pub. Date: Jul. 12, 2018

(65) Prior Publication Data
US 2019/0350069 A1    Nov. 14, 2019

(30) Foreign Application Priority Data
Jan. 4, 2017 (EP) .................... 17150267

(51) Int. Cl.
*H05B 37/02* (2006.01)
*H05B 47/175* (2020.01)
*H05B 47/105* (2020.01)

(52) U.S. Cl.
CPC ......... *H05B 47/175* (2020.01); *H05B 47/105* (2020.01)

(58) Field of Classification Search
CPC ............ H05B 37/0218; H05B 37/0227; H05B 37/0245; H05B 37/0272; H05B 37/0281
(Continued)

(56) References Cited

U.S. PATENT DOCUMENTS

2012/0041917 A1    2/2012  Newton et al.
2012/0296476 A1    11/2012 Cale et al.
(Continued)

FOREIGN PATENT DOCUMENTS

WO    201115175 A1    12/2011
WO    2018037002 A1   3/2018

OTHER PUBLICATIONS

Veitch, J.A., "Psychological Processes Influencing Lighting Quality," National Research Council Canada, NRCC-42469, V. 30, No. 1, 2001 (21 Pages).

*Primary Examiner* — Tung X Le
(74) *Attorney, Agent, or Firm* — Meenakshy Chakravorty

(57) ABSTRACT

According to one aspect disclosed herein, there is provided a lighting control system for controlling one or more luminaires of a lighting system to illuminate an environment, the lighting control system comprising: an interface for sending control commands to the luminaires; an automation component configured to: automatically control, via the interface, the luminaires according to a set of one or more automation rules stored in a memory accessible by the lighting control system; and a suppression component configured to: process data pertaining to a user in the environment from at least one data source to monitor activity exhibited by the user in the environment; detect a condition of increased user stress based on the activity monitoring; identify at least one of the automation rules as a potential (Continued)

cause of the increased user stress; and suppress or modify the identified automation rule for at least one of the luminaires based thereon.

9 Claims, 3 Drawing Sheets

(58) Field of Classification Search
USPC .................................. 315/149, 307, 312
See application file for complete search history.

(56) References Cited

U.S. PATENT DOCUMENTS

| | | |
|---|---|---|
| 2014/0288382 A1 | 9/2014 | Lemmens et al. |
| 2016/0033950 A1 | 2/2016 | Ji |
| 2016/0234595 A1 | 8/2016 | Goran et al. |
| 2017/0208664 A1* | 7/2017 | Mead ..................... G05B 15/02 |
| 2017/0277373 A1* | 9/2017 | Jeong ..................... G06F 1/1643 |
| 2018/0078731 A1* | 3/2018 | Wendt ..................... B60Q 3/18 |
| 2019/0141823 A1* | 5/2019 | Mason ................ H04M 1/7253 |

* cited by examiner

| Rule ID | Behaviour | Priority | Obvious? | Supressible? |
|---|---|---|---|---|
| A | IF(08:00<t<09:00) = ENERGIZE | 1 | YES | NO |
| B | IF(motion sensed=YES)=ON | 3 | YES | YES |
| C | IF(22:00<t<23:00) = SUNSET | 2 | NO | YES |

ADAPTIVE LIGHTING AUTOMATION

CROSS-REFERENCE TO PRIOR APPLICATIONS

This application is the U.S. National Phase application under 35 U.S.C. § 371 of International Application No. PCT/EP2017/084038, filed on Dec. 21, 2017, which claims the benefit of European Patent Application No. 17150267.7, filed on Jan. 4, 2017. These applications are hereby incorporated by reference herein.

TECHNICAL FIELD

The present disclosure relates to automated control of lighting systems, and in particular to the adaptation thereof based on the needs of users.

BACKGROUND

Electronic devices are becoming ever more connected. A "connected" device refers to a device—such as a user terminal, or home or office appliance or the like—that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user device such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected lighting systems consist of fixed light sources, which can be controlled through wall-mounted switches, dimmers or more advanced control panels that have pre-programmed settings and effects, or even from an app running on a user terminal such as a smart phone, tablet or laptop. For example, this may allow user to create an ambiance using a wide range of colored lighting, dimming options and/or dynamic effects. In terms of control the most common approach is to replace a light switch with a smartphone based app that offers extended control over lighting (for example Philips hue, LIFX, etc.).

In particular, connected lighting systems allow for various aspects of the lighting to be automated. For example, a particular lighting scene may be triggered in response to sensor input (such as a motion sensor) or according to a schedule (e.g. during the morning each day). A lighting scene is an overall lighting effect in an environment rendered by the light sources in that environment. E.g. a "sunset" scene may be defined in which the light sources are set to output hues in the red-yellow range of the visible spectrum. Each light source may for example output the different hues (or other setting such as saturation or intensity), or a scene may be rendered by all (or some) lights rendering a single color or similar colors. Note that lighting scenes may be dynamic in that the output of one or more light source changes over time.

In addition to automated scene changes, connected lighting systems are able to render lighting scenes by receiving lighting instructions over the network (e.g. a ZigBee network) from, for example, a user device such as a smart phone, and interpret the lighting instructions in order to determine the appropriate lighting settings for each light source in order that the lighting system renders a desired lighting scene in the environment.

SUMMARY

The world of home automation is accelerating fast with many systems aiming to provide automated actions for all aspects of the home. For example, in addition to the primary function of providing desired illumination, some connected lighting systems may be configured to provide, within this, a secondary information output function, for example to convey information about weather, incoming messages or feedback on the status of the lighting system. This can be provided by way of visible indicators rendered automatically in the illumination, such as changing colors and/or dynamic effects.

However, automation can induce a feeling of being 'out of the loop' as the user may not always know what is happening or why. As more people are buying into smart home technologies, this is expected to become an increasing source of stress for some people (such as those temporarily suffering from a burnout or the elderly or those with dementia). The feeling of being out of control is not pleasant and this feeling is a main cause of stress, and therefore these groups of people, and others, may not wish to buy into smart home technology because of their fear of being out of control of their home.

One problem with existing smart home systems is that they do not have a degree of awareness of when and how to operate. Current solutions to this problem aim to provide users with more and more feedback on what is happening, such as via a dashboard on an app but this can also result in information overload and thus only increase the feeling of being out of control, potentially serving to exacerbate the problem of stress.

The present invention recognizes that rigorously performed automation actions (i.e. according to a predefined rule), although alterable via involved user input, can be a surprise to a user who has perhaps forgotten about the predefined rule (or is not the person who set the rule). Based on this, the present invention solves the above-outlined problem by providing an automated system that can sense a user's stress level and adjust the degree of automation offered to help ensure that they maintain that feeling of being in control (i.e. reducing the level of automation in response to a raised stress level).

Hence, one aspect of the present invention is directed to according to a lighting control system for controlling one or more luminaires of a lighting system to illuminate an environment, the lighting control system comprising: an interface for sending control commands to the luminaires; an automation component configured to: automatically control, via the interface, the luminaires according to a set of one or more automation rules stored in a memory accessible by the lighting control system; and a suppression component configured to: process data pertaining to a user in the environment from at least one data source to monitor activity exhibited by the user in the environment; detect a condition of increased user stress based on the activity monitoring; identify at least one of the automation rules as a potential cause of the increased user stress; and suppress or modify the identified automation rule for at least one of the luminaires based thereon.

The rule can for example be modified or suppressed autonomously by the controller, in response to it being identified as the potential cause of stress. As another example, the controller may respond by outputting a message to the user, noting that the rule has been identifies as a potential cause of his stress, and asking the user if he wishes for it to be suppressed or modified; in that event, the suppression/modification can be performed in response to the controller receiving confirmation from the user that the rule should indeed be suppressed or modified. Note that both of these are examples of "adaptive" behavior, as that term is used herein.

In embodiments, the identified automation rule is suppressed by turning it OFF.

In embodiments, the identified automation rule is modified by modifying a parameter of the rule such that the effects of the automation rule are less noticeable to the user (e.g. by decreasing a change in luminaire brightness resulting from enactment of the rule).

In embodiments, the suppression or modification of the identified automation rule is performed based on the identification of that rule, e.g. by automatically performing said suppression or modification in response to the identification.

The at least one automation rule is suppressed or modified for the at least one luminaire in that the suppression component prevents light emitted by that luminaire from being varied, by the automation component, according to that automation rule for at least one interval of time. That is, to prevent variations in at least one characteristic of the emitted light that would otherwise be exhibited in that time interval as a consequence of that automation rule were it not being suppressed. For example, if at least are of the automation rules can be identified by the suppression component as the possible cause of an increase in the user's stress level, the rule (or rules) can be suppressed in response to counteract that increase.

This can for example be effected by modifying the operation of the automation component, or by instructing the luminaire to ignore certain commands from the automation component. The former may for example be more appropriate when the components are implemented on the same device. The latter may for example be more appropriate when they are implemented on different devices that operate independently.

In the described embodiments, the automation rule defines one or more automated actions to be carried out by the luminaire, e.g. at certain times and/or in response to certain signals (such as sensor signals). Suppressing the automation rule prevents that action(s) from being carried out by the luminaire for as long as that automation rule is suppressed. A user's stress level is determined based on the received data and monitored for indicators of increases to the user' stress level (e.g. above a threshold). Note that for some types of data an increase in the sensed value may indicate increased stress (e.g. perspiration) and for some other types of data a decrease in the sensed value may indicate increased stress (e.g. heart rate variability HVR).

In embodiments, each of said set of automation rules has an intuitive type or a non-intuitive type, and wherein identifying the at least one automation rule as the potential cause comprises identifying the type of that rule as non-intuitive. The suppressibility (whether a particular rule is suppressible or not) of a rule can be stored in memory along with the rule for use by the suppression component, and can be determined based on e.g. explicit user input (via a user device) from the user, or implicitly for example based on the amount of time the rule has been stored in memory (and optionally the amount of time since it was last suppressed).

In embodiments, the suppression component is further configured to determine a priority level of the identified at least one automation rule, and perform said suppression on condition that the determined priority level is below a threshold priority level.

In embodiments, each of said set of automation rules has a suppressible type or a non-suppressible type, and wherein the suppression component is further configured to perform said suppression on condition that the identified at least one automation rule is of a suppressible type.

In embodiments, the suppression component is further configured to, in response to said suppression, provide an automation rule suppressed message to the user to inform the user of the suppressed rule. The automation rule suppressed message may indicate the particular one of the automation rules which has been suppressed, and may be a visual indication provided by e.g. one or more of the luminaires of the lighting system (such as a changing color or flashing light), or provided on a graphical user interface of a user device (e.g. the user's smartphone). The message may also be an audio message provided by speakers within the environment, e.g. an alarm.

In embodiments, the automation rule suppressed message informs the user that the system has switched to a manual mode in which other users (e.g. family) can take over control.

In embodiments, said data source is an input device and wherein said data from the input device is user input, such as user input for controlling one or more of the luminaires, provided by the user using the input device. The input device may be a control device of the lighting system (i.e. a control device arranged to control one or more of the luminaries) or may be a control device of an external system (e.g. another automated home system such as a HVAC system). Thus, a user providing control input for one or more of the luminaires can result in both the luminaires being controlled according to the user provided control input, when at the same time the condition of increases user stress may be detected based upon the user providing the control input via the control device. As such, a single action by the user (i.e. providing control input via the control device, such as a wall switch) may both control the one or more luminaires according to the control input provided as well as cause suppression or modification of an automation rule.

In embodiments, said user input is a plurality of instances of the user providing the same user input.

In embodiments, said user input is input from a pressure sensor of the input device.

In embodiments, said data source is a sensor for monitoring said activity. For example, a presence sensor, motion sensor etc.

In embodiments, said data source is a user device, and wherein said data are physiological data from the user device. The user device may be a wearable user device. The physiological data may be at least one of heartrate, perspiration, blood pressure of the user.

In embodiments, said data source is a microphone within the environment, and said data is speech of the user.

In embodiments, said activity is an increase in at least one of volume or pitch of the speech of the user.

In embodiments, said activity is a use of profanity by the user.

In embodiments, said activity is one or more of: a posture of the user; a rigidity of movements of the user; input from an app installed on a user device operated by the user; a travel characteristic of the user identified in location data from a user device of the user; a speed of typing of the user.

In embodiments, the set of one or more automation rules comprises at least one automation rule specifying a lighting scene to be rendered by the at least one luminaire during a time period.

In embodiments, the set of one or more automation rules comprises at least one automation rule specifying a lighting scene to be rendered by the at least one luminaire in response to sensor data. For example, a rule specifying one or more luminaires to turn ON in response to presence sensor data indicating user presence within the environment.

According to a second aspect disclosed herein, there is provided a method of controlling one or more luminaires of a lighting system to illuminate an environment according to a set of one or more automation rules stored in a memory accessible by the lighting control system, the method comprising: receiving data pertaining to a user in the environment from at least one data source; processing the received data to monitor activity exhibited by the user in the environment; detect a condition of increased user stress based on the activity monitoring; identify at least one of the automation rules as a potential cause of the increased user stress; and suppress or modify the identified automation rule for at least one of the luminaires based thereon.

According to a third aspect disclosed herein, there is provided a computer program product comprising computer-executable code embodied on a computer-readable storage medium configured to as when executed by one or more processing units to perform the steps according to the second aspect.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
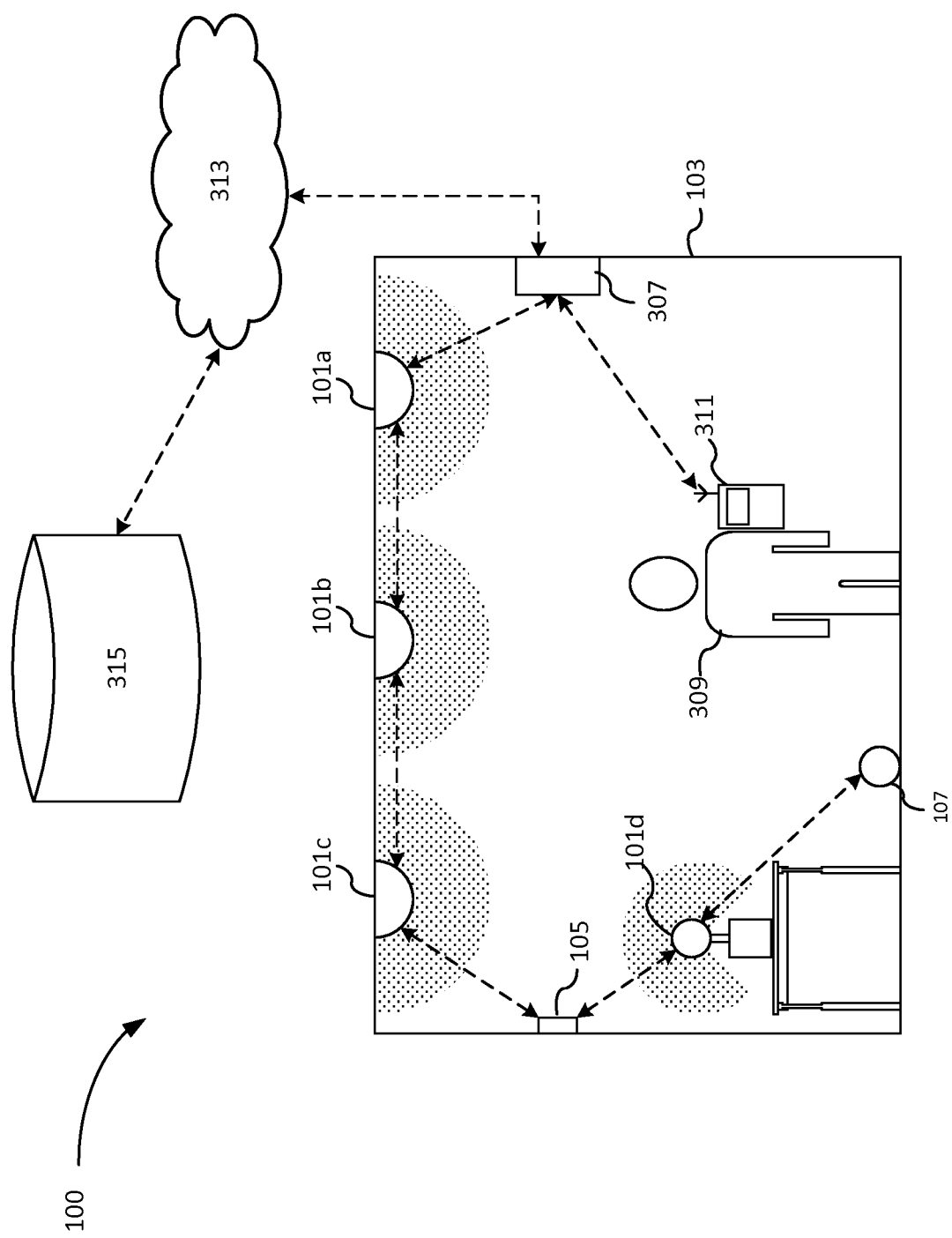
FIG. 1 shows a lighting system in accordance with embodiments of the present invention.

Automation can be highly useful, helping people to accomplish more tasks and to reduce their physical or cognitive load. The irony of automation, however, is that as more is automated the user's need to be more skilled in monitoring the system to ensure that the automated actions are correct and operating as planned. There have been many accounts of incidents being caused by the users being 'out of the loop' and not knowing what the automated system is doing. This can be a great source of stress and panic when things go wrong particularly for vulnerable users. Automation works well when the users and the system are well aligned and they understand what each is doing—feedback and feedforward are an important aspect of automation.

Particularly when it comes to the home (where users are typically less skilled or technical) an automated system, even if set up by the user themselves, can still induce a feeling of being out of the loop. This is especially true when the user's mental state may change over time. Stress and depression are becoming more common as the pressure on people at work and in society increases. One key component of stress is the feeling of being out of control and not knowing what is happening around you. In these conditions automated systems may hinder recovery as the user may not remember why their home or lighting is acting the way it is or cannot influence it and this will accentuate the feeling of being out of control.

When a user is feeling stressed their behavior changes accordingly and this can be picked up in a variety of ways using a variety of data sources, such as sensors, user interfaces and other data sources. Physiological signs from a wearable device worn by the user may be the most accurate as they can be direct measurements of things such as increased heart rate or perspiration commonly associated with stress, but other signs can be used. For example, the user's interactions with a lighting system can indicate stress such multiple repeated presses of the same control button. Data from sensors may also be used for example use of profanity by the user can indicate stress and this can be detected by a microphone.

Embodiments of the present invention determine when the state of the user moves towards high stress, and reduce the number of automated actions performed in order to reduce the user's stress level (as the reduction in automation level will not increase the user's feeling of being out of control). Thus, the automation component can control the automation level of the automatic control of the luminaires according to one of multiple automation levels; wherein at least one automation level of the multiple automation levels causes less automated actions to be performed by the automation component than another automation level. The suppression component can thus be configured to select an automation level dependent upon the detection of increased user stress, or the level of user stress, such that an automation level is selected which causes less automated actions to be performed when user stress is high, or at a higher level, compared to the automation level which is selected when user stress is low, or at a lower level. Optionally, the user can be informed of the change in automation level. In a simple embodiment, the lighting functions switches to a basic manual interaction state for the duration of the stressful period, or when stress level is above a threshold, in which no automated functions are performed. In other words, the luminaires would only be controllable through manual control during the basic manual interaction period to avoid any automated control which may cause the user to feel more out of control, thereby increasing the stress level of the user.

FIG. 1 shows a system 100 according to embodiments of the present invention. An environment 103 contains a plurality of luminaires 101a-d and a switch 105. Luminaires 101a-c are ceiling type luminaires designed to provide illumination in the environment 103 from above. Luminaire 101d is a free-standing lamp type luminaire placed on a table designed to provide illumination in the environment 103 from a lower position than the ceiling type luminaires 101a-c. Each of the luminaires 101a-d may be any suitable type of luminaire such as an incandescent light, a fluorescent light, an LED lighting device etc. The plurality of luminaires 101a-d may comprise more than one type of luminaire, or each luminaire 101a-d may be of the same type.

A basic luminaire may consist simply of a light bulb or bulbs (e.g. LED, a filament bulb or gas-discharge lamp) and any associated support structure. Other luminaires may also comprise, for example, an associated casing or housing though others may not. A luminaire can take the form of a traditional ceiling or wall mounted room luminaire, or free standing luminaire (such as a floor or table lamp, or portable luminaire); or it may take a less traditional form such as an LED-strip embedded in or installed on a surface or item of furniture, a wall washer, or any other form of illumination device adapted to provide illumination specifically. Components for communicating with a bridge 307 (e.g. dedicated circuitry, FPGA, processors and accompanying software (e.g. firmware) as applicable) may be incorporated in a light bulb with a standard fitting, to allow easy retrofitting of connected lighting functionality into existing, non-specialized lighting systems. However, this is not essential and in general these communication components can be incorporated at any suitable location in the lighting system to allow communication between the luminaires and the bridge 307.

It is noted that the terms "luminaire", "light source" and "illumination source" are used interchangeably herein, to refer to a device which emits not just any light, but specifically illumination, i.e. light on a scale suitable for contributing to the illuminating of an environment occupied by one or more humans (so that the human occupants can see within the physical space as a consequence). Note also that the term "lighting" also refers to illumination in this sense.

The switch 105 is shown in FIG. 1 as a wall-mounted switch and may be any suitable type of switch allowing user input to control the plurality of luminaires 101a-d. For example, the switch 105 may be a simple on-off controller switch or may allow for more complex control such as dimming and possibly even control of individual lighting characteristics such as hue and saturation. The switch 105 may also be a portable switch (portable remote control) capable of being moved from one environment to another. The term "switch" is used herein to refer to any control device allowing a user to input commands into the lighting system.

The plurality of luminaires 101a-d, the switch 105, along with a lighting bridge 307 form a connected lighting network. That is, they are all interconnected by wired and/or wireless connections, indicated by dotted lines in FIG. 1. In particular, FIG. 1 shows "chaining" connections such as may be implemented in a ZigBee lighting network, wherein it is not necessary for each device to be directly connected to each other device. Instead, devices are able to relay communication signals which allows for, for example, luminaire 101c to communicate with the lighting bridge 307 by relaying data through luminaires 101b and 101a to lighting bridge 307. However, it is not excluded that other network topologies may be employed. For example, a "hub-and-spoke" topology may be used in which each device is directly connected (e.g. wirelessly) to the lighting bridge 307 and not to any other devices in the network.

As another example, each luminaire in the network may be configured according to one communication protocol, such as ZigBee, and the switches may be configured according to another communication protocol, such as WiFi. Hence, it is appreciated that the luminaires may communicate with each other and the lighting bridge 307 without relaying data through a switch as shown in FIG. 1, and the switch 105 may communicate directly with the lighting bridge 307. In any case, it is understood that the lighting bridge 307 is able to communicate, by whatever appropriate means, with each other device in the lighting network.

Lighting bridge 307 is arranged at least to receive input (e.g. from switch 105) and to send lighting control commands to luminaires 101a-d.

FIG. 1 also shows a user 309 and user device 311 such as a smart phone. The user device 311 is operatively coupled to the lighting bridge 307 by a wired or wireless connection (e.g. WiFi or ZigBee) and hence forms part of the lighting network. User 309 can provide user input to the lighting bridge 307 via the user device 311 using, for example, a graphical user interface of the user device 311. The lighting bridge 307 then interprets the user input and sends control commands to the luminaires 101a-d accordingly. As mentioned above, the user device 311 generally allows for more complex control than the switch 105. For example, the user 309 may use the user device 311 to control an individual luminaire. In general it is desirable that the switch to control the luminaires in the same environment as the switch itself, i.e. in FIG. 1 switch 105 controls only luminaires 101a-d, but the user device 311 may control any luminaire at all within the lighting network. For example, the user 309 may use the user device 311 to control a luminaire in another environment, such as controlling a luminaire in a different room other than the room in which the user 309 and user device 311 are currently. This is particularly advantageous because the user device 311 is generally more portable than a switch (particularly a wall-mounted switch), and hence may be used at different physical locations. The user device 311 may be used to control the plurality of luminaires 101a-d to render a lighting scene, e.g. by the user 309 selecting the lighting scene and desired luminaires using a GUI of the user device 311.

As illustrated in FIG. 1, lighting bridge 307 may also be provided with a wide area network (WAN) connection such as a connection to the internet 313. This connection, as known in the art, allows the lighting bridge 307 to connect to external data and services such as memory 315. Note that the wireless connection between user device 311 and the lighting bridge 307 is shown in FIG. 1 as a direct connection, but it is understood that the user device 311 may also connect to the lighting bridge 307 via the internet 313.

A sensor 107 is also present within the environment 103. The sensor 107 is part of the lighting network in that it is arranged to communicate with the network via a wired or wireless connection. That is, the sensor 107 is arranged to at least be operatively coupled to the lighting bridge 307. The sensor 107 may be any suitable form of sensor for detecting a property within the environment 103 which can be used to determine a stress level of the user 309. For example, the sensor 107 may be a microphone arranged to detect noise within the environment 103 from which a volume of the user's speech can be determined or from which the words of a user's speech can be determined. Either of these examples can be used as indicators of stress as is described in more detail below.

Although shown in FIG. 1 as a single entity, it is understood that any suitable sensor or plurality of sensors may be used to provide the functionality ascribed herein to the sensor 107.

Given the above description, it is appreciated that the lighting system 100 shown in FIG. 1 is arranged to function as a connected lighting system and therefore that the luminaires 101 may be configured to behave according to one or more automation rules. As a first example, the bridge 307 may be configured to control luminaires 101a-c to emit bright white light in response to a motion sensor (an example of sensor 107) detecting motion of the user 309 within the environment 103. As a second example, the bridge 307 may be configured to control luminaires 101a-d to emit a red hue during a scheduled time period such as 22:00-23:00 each day.

Embodiments of the present invention seek to make the automated system 100 more sensitive to the mental state of the user 309. For example, if the system 100 determines that the user 309 is stressed, it will not alter the lighting in an obvious way and instead giving up some control to the user

309 (suspending one or more of the automated rules). Additionally, the user 309 be informed of the change in automation and/or the adjustments to the lighting control can be done in a very gentle and almost unnoticeable way (e.g. by modifying the one or more identified automation rule to have a less noticeable effect rather than simply suppressing it by turning it OFF). Modifications to the one or more rules can be particularly advantageous in circumstances where the rules are causing user stress by being enacted "too much" or "too frequently". In these cases they can be modified to either be less extreme (e.g. by decreasing a change in brightness enacted by the rule) or less frequency (e.g. by increasing a time between successive enactments of the rule). The system, whether simply turning rules ON/OFF, or modifying the rules is adaptive in the sense that its behavior can change, whether this change in behavior is in response to user input (e.g. to instantiate a new rule, or delete an old rule etc.) or automatically (e.g. the system turning ON/OFF or modifying a rule).

Which one or more of the automation rules are suspended can be determined in various ways. For example, the rules may be ranked in priority and the rules can be suppress starting from the lowest priority and working up, suppressing more and more rules until the user's stress level returns to normal (low), e.g. a rule specifying the lighting responding (e.g. by flashing) to e-mail or social media notifications may be low-priority whereas rules related to calming or energizing may be the last to be removed (high-priority) etc.

Figure 2:
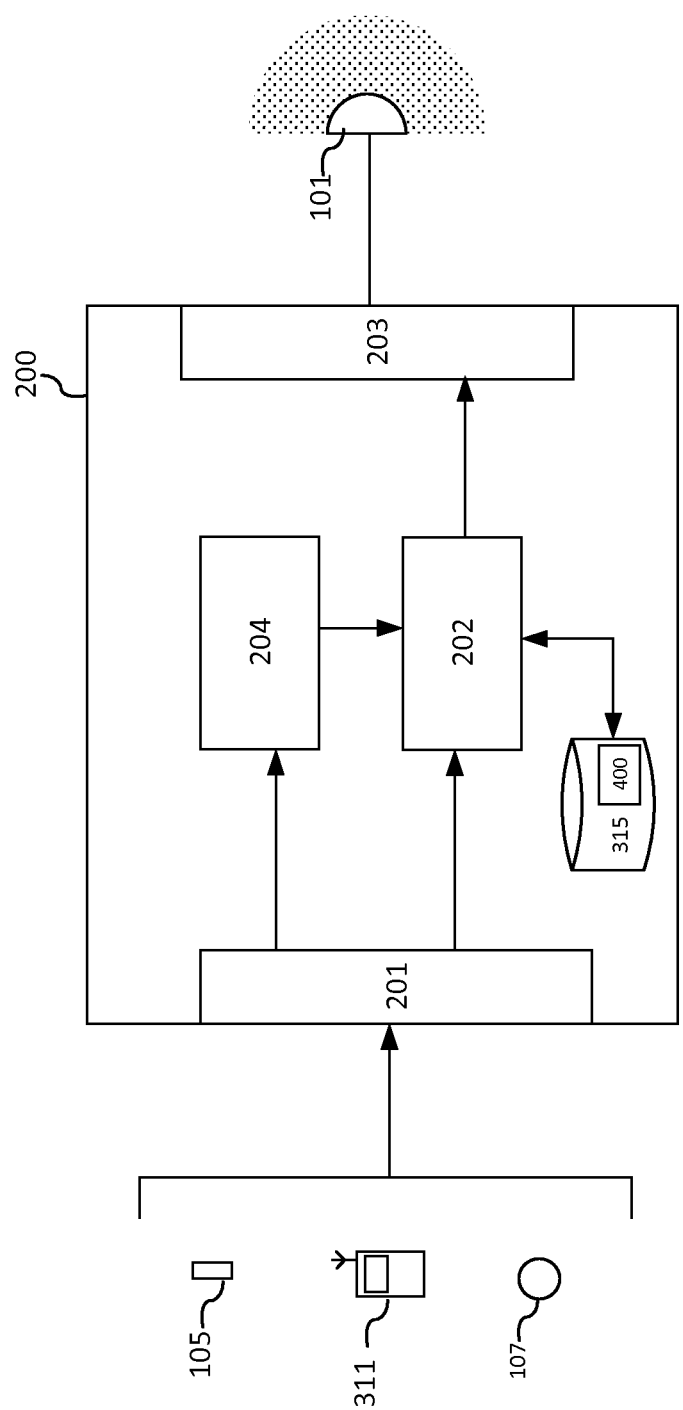
FIG. 2 is a block diagram of a lighting system controller for controlling the lighting system.

FIG. 2 shows a lighting control system 200 according to embodiments of the present invention. The lighting control system 200 is arranged to control the lighting system 100 shown in FIG. 1 and described above. To do so, the lighting control system 200 may be implemented in any of the components of the lighting system 100 (i.e. the bridge 307, the user device 311, a luminaire 101, the switch 105 or the sensor 107). Alternatively, the lighting control system 200 may be implemented as a dedicated element of the lighting system 100 (hence not shown in FIG. 1) which is provided with access to the connected lighting network. It is also not excluded that the lighting control system 200 may be implemented in a distributed manner, with some functionality being performed in one device of the lighting network 100 and some in a different one or more device(s). For example, partly in the bridge 307 or user device 311 and partly in each of the luminaires 101*a-d*.

The lighting control system 200 comprises an input 201, an automation controller 202, an interface 203, a suppression component 204 and a memory 315 (though the memory 315 may be external to the lighting control system 200 as described in more detail below). The automation component 202 is operatively coupled to the input 201, the memory 315, the interface 302 and the suppression component 204. The suppression component 204 is also operatively coupled to the input 201. It is appreciated that the elements of the lighting control system 200 are functional blocks only and that the functionality ascribed herein to each element may be performed by more than one individual module (e.g. more than one individual piece of hardware, such as more than one processor). Generally, the automation component 202 and suppression component 204 represent respective functionality of the control system 200, that is implemented by code executed on a processor (CPU/CPU(s)) or processors of the control system 200. The code can be stored in electronic storage 200 of the system 200 for execution on the processor(s) (not shown). Alternatively, at least part of this functionality can be implemented in dedicated hardware of the system 200, such as an application specific integrated circuit, FPGA etc.

The input 201 comprises one or more input interfaces for receiving data from external sources via a wired or wireless connection. For example, the input 201 may comprise a wireless interface for receiving data from an external source via a wireless signal in accordance with a wireless communication protocol such as WiFi, Bluetooth, ZigBee etc. In any case, the input 201 is arranged to receive said data and provide it to both the automation component 202 and the suppression component 204. The data mentioned above may originate from any one or more of the switch 105, the user device 311, or the sensor 107 as shown in FIG. 2.

The automation component 202 (also called the automation controller 202) is arranged to control one or more of the luminaires 101*a-d* (shows a single luminaire 101 in FIG. 2) in accordance with a set of one or more automation rules 400 stored in memory 315. That is, the automation component 202 is arranged to access memory 315 to retrieve the automation rules 400; to process the rule(s) to determine a setting for the luminaire 101; and to control the luminaire 101 to emit light according to the determined setting. This control is performed by transmitting a lighting control signal to the luminaire to be controlled via the interface 203 (described below).

The automation component 202 is also arranged to receive data from the external source(s) via the input 201. These data may be used in processing the rule(s) to determine the setting for the luminaire 101. For example, a one of the rules 400 may specify that the luminaire 101 is to be turned on in response to motion detection by motion detector 107. In this case, when the automation component 202 receives data from the motion detector 107 indication user motion within the environment 103, it processes these data along with the one of the rules 400 to determine that the luminaire 101 is to be turned on, and controls the luminaire 101 to turn on.

The interface 203 (also called the output 203) comprises one or more communication interfaces for transmitting data including at least control signals to the luminaires 101*a-d* in accordance with any suitable communication protocol well-known in the art and so not described in more detail here.

The suppression component 204 (also called the override component 204, or automation level controller 204) is arranged to receive data from external sources via the input 201 in the same manner as described above in relation to the automation component 202. For ease of explanation this is not repeated here but it is noted that in case the input 201 comprises two or more individual input interfaces, the suppression component 204 and automation component 202 may receive said data via different interfaces of the input 201.

The suppression component 204 receives the data and processes the data to determine a user stress level (i.e. a measure of the amount of stress the user 309 is under). If it is determined that the user stress level could be lower, the suppression component sends a signal to the automation component 202 to cease enacting at least one of the rules 400 identified by the suppression component 204 as a potential cause of the increased stress level. As mentioned above, this results in less automated behavior being performed by the system 100 and more manual control being required from the user 309, which acts to reduce the amount of stress felt by the user 309 as he is given back more control.

In some cases, the system may not be completely certain that one of the rules 400 is actually causing the user's stress, but can identify it as a potential cause based on various characteristics of the rule in question, and suppress it as a precaution. For example, whether or not a given rule is known to the user 309 (intuitive). See also "obvious pain points" below. For example, rules which cause significant deviation from "normal" illumination settings e.g. as set by the user (e.g. significant color changes, fast dynamic etc.) can be identified as potential causes of stress.

Note that the suppression component 204, rather than signaling to the automation component 202 to suppress a behavior specified by a rule, could also signal to one or more of the luminaires 101a-d directly (via the interface 203) to ignore commands received at that luminaire which pertain to that rule. This may be appropriate is for whatever reason, the suppression component 204 is enable to control the operation of the automation component 202 itself.

In either setup, the suppression component 204 may also determine from the received data that the user's stress level has lowered and in response signal to the automation component 202 (or luminaires 101a-d) to reinstate the rule (restore the behavior associated with that rule).

There are several measures (metrics) which can indicate stress. For example, some physiological variables (e.g., skin conductance/heart rate variability), voice (e.g., pitch), posture (e.g. more rigid movements) or subjective input (e.g. questionnaire). Output of these measures are, potentially after a pre-processing stage, single numbers (scalars). These numbers can be used as metrics of stress and are particularly useful when analyzed in context of the average value of that metric for the user. "Triangulation" of several sensors input may be used to increase the accuracy of the state measured. That is, multiple different metrics from multiple sensors may be correlated to determine an overall stress metric having a higher confidence level than the individual sensor data. One way to perform this correlation is to look for delta changes in the values. If a value suddenly increases/decreases it can signify a change in stress level. If an increase/decrease is exhibited in data from multiple sensors at the same time, this can be identified as a higher confidence indication.

Stress, and mental states in general are best described on a continuous scale, i.e. a continuum, and interpretations of above mentioned variables should be seen in the context of the individual user (e.g. relative to average or base values). There is not a fixed point on the continuum of a person but one can be defined: as for example a value X % higher than the average baseline value of a user. In general, a measure of the user stress can be determined in a variety of ways:

Interactions with the lighting system: repeated cancelling or questioning/overreacting to an automated action can be inferred as a sign of stress or confusion with what the system is doing. This will show up in data received by the switch 105 (repeat or excessive presses within a given time) or user device 311 (excessive input) which can either be determined by the suppression component 204 from the "raw" data or may be determined at the external device (e.g. the switch 105 or user device 311) and then an explicit indication of a raised user stress level can be provided to the suppression component 204. The switch 105 (or user interface of the user device 311) may comprise a pressure sensor for detecting a force with which the user 309 provides the user input (e.g. a press of a button). In these cases the indication of excessive input can be a reading of a large pressure from the pressure sensor.

Physiological input via a wearable device: many wearable devices can detect heart rate, skin conductance, motion among others, and these inputs are being used to infer the level of stress the wearer may be experiencing at any given moment. That is, the user device 311 may be a wearable device or other device capable of detecting a physiological value of the user 309 and providing this data to the suppression component 204.

Stress deduced from voice commands issued to the system, elevated pitch, increased volume, swearing. Any and all of these can be detected in data captured by a sensor (sensor 107) such as a microphone 107.

Physical mannerisms that are associated with stress such as repeatedly looking at the floor, lethargy, increased sedative activity (e.g. TV watching or staying in bed), or a reduction in sleep, a reduction in household chores. These can be detected in data captured by a sensor (sensor 107) such as a presence and/or motion sensor 107, particularly if combined with information on the layout of the environment 103 and objects placed therein. For example, a user presence on the bed with very little motion may be used to determine that they are staying in bed which can be a sign of stress.

Increased intake of alcohol (e.g. more frequency visits to a liquor store as measured by a location of the user's phone), increase in ordering takeout (e.g. more frequent or larger orders via a takeaway food app on the user's phone), less interaction with others (e.g. less frequent use of social media apps on the user's phone).

Cognitive symptoms of stress may also be detected such as memory problems (forgetting to switch appliances off, checking items frequently).

Historical data from the user. If the user 309 has experienced stress before, informing a smart system of when and what the particular symptoms were could help the system to identify any new stress episode earlier. For example, if a previous determination was made by the suppression component 204 that the user 309 was stressed based on a lack of motion and an increased heart rate, the suppression component 204 may store this characterizing signal and use it to make future determination, i.e. if received data indicate that the user 309 is not moving much and the user's 309 heart rate is elevated, the suppression component 204 can determine that the user 309 is stressed.

Input from a third party (via a network or internet) such as a counsellor or psychiatrist. That is, external data may also be received at the suppression component via the input 201 which aid in determining the current stress level of the user 309.

One or more of: a posture of the user as identified using a camera and known image processing techniques; a rigidity of movements of the user again identified using a camera; input from an app installed on a user device operated by the user such as takeaway orders; a travel characteristic of the user identified in location data from a user device of the user such as increased visits to a liquor store; a speed of typing of the user e.g. on the user device.

Deviations from typical living patterns that may indicate an increase in stress that can subsequently inform the system. Such as increased use of the TV, less time spent cooking, reduced (or increased) use of cleaning devices, etc.

Combinations of the above. It is appreciated that the above are only examples of data which may be used to infer stress, and that a combination of two of more of these sources may be used. Indeed, the determination made by the suppression component 204 may be more reliable if more sources are taken into account. That is, if two or more sources each simultaneously imply an increased stress level, the suppression component 204 can determine that the stress level is elevated with a higher degree of confidence.

The control system 200 preferably operates in a smart way when making inferences and judgements since any single occurrence of any of the above could easily be an isolated case and thus may not be indicative of stress per se. Ways to mitigate the misattribution of stress include the use of more than one source to corroborate a finding of elevated stress (as mentioned above), and the length of time increased stress is indicated by the data. In the latter case, sustained increase in the frequency of one or more of the indications mentioned above over time can increase the confidence in the diagnosis. One example implementation is for the suppression component 204 to assign points that indicate a degree of certainty with regards to detecting stress or frustration, and to accumulate the points over time. Once the total number of points detected from the various sources reaches a threshold, the suppression component 204 can determine to switch to a manual state (i.e. to suppress one or more of the automation behaviors specified by one or more of the rules 400). For example, the user 309 speaking with profanity in voice commands may be assigned many points while other more in-direct cues may be assigned fewer points (such as an increase in the user's voice volume level). The system can be self-learning, combining the data from physiological input with voice command data and other interactions with the system, such as repeated cancelations to better understand a user's stress response. An example of this was mentioned above in which the past indicators of stress for a particular user can be given more weight (more points).

Once the suppression component 204 has deduced that the user's stress levels may be increasing the next step is to begin to judge whether or not, or how to return control back to the user 309 so that the automated system 100 does not act as a contributing factor to their stress levels. Options include:

Do nothing. The automation may not be a source of stress on this particular occasion. This can be deduced by how the user 309 react to the changes made by the system 100. If their reactions (as measured by the sensor 107, the user device 311, and/or the switch 105) to the automated changes are calm and fit with 'normal' behavior patterns then altering the automation may only add to their stress levels rather than helping to reduce them. Perhaps the user 309 is happy in the knowledge that the system 100, if well set-up, will take care of things for them during these difficult episodes. In this case, the level of automation may actually increase as the system offers to take on more work. This will need to be managed in an open and explicit way with the user to check they are happy with this. But, if they are not willing to engage with the system e.g. not looking at the dashboard notifications, or listening to the messages via an Amazon Echo like device, then these should also be seen as inputs and a likelihood that stress is increasing. A first example of increasing automation is simply reinstating rules which were previously suppressed. A second example is to initiate one or more further automation rules which are not (currently, or yet) part of the set of automation rules for the system but which are stored remotely (e.g. on a cloud-based service) and can be retrieved by the system (e.g. over the Internet) and added to the stored set of rules. For example, a user forgetting to switch off lights when he leaves his home could be detected by the system and a new rule can be adopted which switches the lights off in response to a geo-fence notification that the user has left his home area.

Put automation on hold entirely. In a simple embodiment, if the level of stress experienced by the user 309 is determined to be high, the best course of action may be to hand back all control to the user. This is especially the case if the user's stress level is determined to be very high (rather than just slightly elevated). In these cases, the suppression component 204 simply instructs the automation component 202 to ignore all the rules 400. The system may spot that the user is already trying to switch the lights themselves or cancelling automated actions frequently and so forth, in a more erratic manner that does not fit with the 'normal' and thus handing back control to the user may make them feel better. Preferably, the user 309 is informed that the system has switched to a "manual mode" (i.e. all automation has been suspended), e.g. via a user interface of the user device 311.

In addition to the two options outlined above which relate to suppressing none of the rules and suppressing all of the rules 400, respectively, there are less crude options also available in which only some of the rules 400 are selectively suppressed. These include:

Remove the obvious pain points. The suppression component 204 determines a likely cause of the stress as being a particular one of the rules 400 by correlating the determined increase in stress with an enactment of one that one of the rules (i.e. if a rule is triggered and this is immediately followed by a detected increased stress level, the suppression component 204 can determine that the likely cause of stress is that one of the rules 400), e.g. the user cancels the change affected by the rule, questions the change (via user device 311), or even makes a verbal or physical action due to feeling confusion as to why it happened. Conversely, if the user's reaction to an automated action is calm and fits with being 'normal' then there may be no issue with that aspect of the automation. In these cases the suppression component 204 signals to the automation component 202 to suppress only that one of the rules 400 which is likely the cause of the stress.

Reduce unnecessary automated actions. If the user's stress level is increasing and particular pain points (as described above) are not obvious, the suppression module 204 may dial back the general level of automation and give the user back control of their home, by selectively suppressing one rule at a time and observing any resulting changes to the stress level. This can be done in a phases, one of which can be to stop the more unnecessary automated actions that may be contributing factors. For example, the use of light as a signal for social media, the ever changing circadian rhythm lighting, dynamic lighting setting, timers for wakeup lights etc. may cause the user 309 to be confused as to why the lights are never the same or why they are turning on or off at those moments. Note that the use of dynamic lighting can be very calming and help to reduce stress but only when operated as an explicit therapeutic action.

Revert to obvious automation (e.g. automation from a cloud-based service could be regarded as "obvious" automation if, for example, the cloud-based rules are entirely user-set). The user 309 will have an idea of what automation is (i.e. an idea of what rules are stored in memory 315) and thus reverting to that stereotype (i.e. the expected set of rules) is an option. For example, lights that turn on and off as the user 309 enters or leaves the room (e.g. using a calm light scene), welcome home lights that help the user 309 to see his keys when standing on the porch, turning on the 'security' garden lighting to show nature etc. may be rules which the user 309 understands well and expects ("obvious rules"). There may be more rules currently active than the user 309 expects which are more likely to be the source of stress. Hence, it may be preferably to suppress those non-obvious rules first when aiming to reduce user stress. Which rules are considered "obvious" can vary from system to system and thus may be specified by the user 309 providing user input to the system (e.g. via user device 311) as to what they would like to happen at these different phases. For example, the use of the wake up light may be acceptable, but the auto on off may not be. The user 309 may explicitly indicate his preferences regarding which rules he understands (and thus should be maintained) using the user device 311 and then these preferences are stored in memory 315 in associated with the respective rule of the set of rules 400.

Secretive support actions. A vision of the ultimate smart home is one that is sentient to our needs and supports us. Therefore, a smart system that just gives up control when things look bad for the user is perhaps less than ideal. The system should provide assistance and help but this may need to be done implicitly and secretively. For example, even if full control has been given back to the user, some automated functions may still function, such as turning off appliances if the user has inadvertently forgotten to turn them off, activating the away from home security setting (as a break in would not help with reducing the user's stress levels!), monitoring actions as a data source for deducing behavior that may help family or healthcare providers monitor the user's health etc. In other words, some rule(s) of the set of rules 400 may be marked in memory 315 as "un-suppressible" and will never be turned off by signaling from the suppression component 204. The suppression component 204 may also provide "guidance" to the user such as providing hints (e.g. via an app on the user's phone or other user interface) towards the most likely actions.

Figure 3:
FIG. 3 is a table showing an example set of automation rules.

FIG. 3 shows an example set of rules 400 as may be stored in memory 315 and enacted by automation component 202. Rule A specifies that an energize scene (e.g. bright blue/white light) should be rendered by the luminaire(s) 101 during 8 am and 9 am, Rule B specifies that the luminaires 101 should be turned on in response to motion detection, and Rule C specifies that a sunset scene (e.g. warm red/yellow light) should be rendered by the luminaire(s) 101 during 10 pm and 11 pm). More or fewer rules may be present in the set 400.

The three right-most columns specify a priority, obviousness, and suppressibility for each rule. These columns are shows with dotted lines to indicate that they are optional as they are only required in some embodiments as described above.

In this example, rule B has the lowest priority, and so in some embodiments may be the first to be suppressed in response to stress detection. In other embodiments, rule C may be the first to be suppressed as it is the only non-obvious rule (i.e. the user 309 has indicated that he is aware of and understands rules A and B) meaning that it is more likely to be the cause of the stress. Rule A is the only non-suppressible rule and therefore in yet other embodiments, all other rules (i.e. both rules B and C in this example) may be suppressed in response to a detection of stress.

It will be appreciated that the above embodiments have been described only by way of example. Other variations to the disclosed embodiments can be understood and effected by those skilled in the art in practicing the claimed invention, from a study of the drawings, the disclosure, and the appended claims.

For example, reinstating automation is also a preferable step. When the user's stressful episode appears to be coming to an end (i.e. when the suppression module 204 later determines from the received data that the user's stress level has returned to normal levels), the suppression module 204 signals to the automation module 202 to reinstate the suppressed rule(s).

The system may also offer automated features that could further assist with the reduction of the user's stress level. For example, as mentioned earlier, the use of dynamic lighting or circadian rhythm lighting may help to calm or regulate the user's daily routine. The pace of recovery may vary and take time thus the suppression module 204 can delay the signaling to reinstate the rule(s) to give the user 309 time to recover. One way of deducing which rule(s) can re-automated is to recognize activity patterns being repeating activates that the user undertakes (e.g. every day at 18:00 the user activates a "dinner" lighting scene). These types of patterns can be determined from the sensor data using learning algorithms (preferably over large sets of data). This then allows those activity patterns that occur more frequently could then be automated first. For example, if the frequency is high enough (e.g. above a threshold, such as once or more per day) then this activity can be automated for the user. In the above example this would comprise analyzing the data to identify that the user acts according to the pattern of switching the dinner scene on at 18:00 each day, and in response creating and storing an automation rule specifying that the dinner scene is to be turned on at 18:00 each day.

The system could also periodically make recommendations for cases of automated levels be that higher or lower— the system could increase or decrease the level of automation in this invention.

There are also other things the system can do in response to detecting an increased stress level. For example:

In the multiuser situation, the system might hand over control to the person who is in more stable state— caregiver, family member. Alternatively the system might be setup such that if multiple user are detected then system continues to behave as set up ignoring the state of a specific person; alternatively it might detect the location of a person and change automation level based on the specific location of the user under stress.

Revert to previous state. The system may determine that his current action was not perceived well and reverts the system to the previous state In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting control system for controlling one or more luminaires of a lighting system to illuminate an environment, the lighting control system comprising:
    an interface for sending control commands to the luminaires;
    an automation component configured to:
        automatically control, via the interface, the luminaires according to a set of one or more automation rules stored in a memory accessible by the lighting control system and
    a suppression component configured to:
        process data pertaining to a user in the environment from at least one data source to monitor activity exhibited by the user in the environment;

detect a condition of increased user stress based on the activity monitoring;

identify at least one of the automation rules as a potential cause of the increased user stress;

suppress or modify the identified automation rule for at least one of the luminaires based thereon; and wherein the data source is a control device arranged to control one or more of the luminaries and wherein said data from the control device is user input provided by the user using the control device.

2. The lighting control system of claim 1, wherein each of said set of automation rules has an intuitive type or a non-intuitive type, and wherein identifying the at least one automation rule as the potential cause comprises identifying the type of that rule as non-intuitive.

3. The lighting control system of claim 1, wherein the suppression component is further configured to determine a priority level of the identified at least one automation rule, and perform said suppression on condition that the determined priority level is below a threshold priority level.

4. The lighting control system of claim 1, wherein each of said set of automation rules has a suppressible type or a non-suppressible type, and wherein the suppression component is further configured to perform said suppression on condition that the identified at least one automation rule is of a suppressible type.

5. The lighting control system of claim 1, wherein the suppression component is further configured to, in response to said suppression, provide an automation rule suppressed message to the user to inform the user of the suppressed rule.

6. The lighting control system of claim 1, wherein said user input is a plurality of instances of the user providing the same user input.

7. The lighting control system of claim 1, wherein said user input is input from a pressure sensor of the input device.

8. A method of controlling one or more luminaires of a lighting system to illuminate an environment according to a set of one or more automation rules stored in a memory accessible by the lighting control system, the method comprising:

receiving data pertaining to a user in the environment from at least one data source;

processing the received data to monitor activity exhibited by the user in the environment;

detecting a condition of increased user stress based on the activity monitoring;

identifying at least one of the automation rules as a potential cause of the increased user stress;

suppressing or modifying the identified automation rule for at least one of the luminaires based thereon; and wherein the data source is a control device arranged to control one or more of the luminaries and wherein said data from the control device is user input provided by the user using the control device.

9. A non-transitory computer-readable storage medium comprising computer-executable code configured such that when executed by one or more processing units, performs the steps according to claim 8.

* * * * *